US009160522B2

(12) United States Patent
Kevenaar et al.

(10) Patent No.: US 9,160,522 B2
(45) Date of Patent: Oct. 13, 2015

(54) SYSTEM AND METHOD FOR VERIFYING THE IDENTITY OF AN INDIVIDUAL BY EMPLOYING BIOMETRIC DATA FEATURES ASSOCIATED WITH THE INDIVIDUAL

(75) Inventors: Thomas Andreas Maria Kevenaar, Sterksel (NL); Aweke Negash Lemma, Eindhoven (NL)

(73) Assignee: Genkey Netherlands B.V., Eindhoven (NL)

( * ) Notice: Subject to any disclaimer, the term of this patent is extended or adjusted under 35 U.S.C. 154(b) by 0 days.

(21) Appl. No.: 13/516,082

(22) PCT Filed: Dec. 15, 2010

(86) PCT No.: PCT/NL2010/050849
§ 371 (c)(1),
(2), (4) Date: Aug. 8, 2012

(87) PCT Pub. No.: WO2011/074955
PCT Pub. Date: Jun. 23, 2011

(65) Prior Publication Data
US 2013/0036309 A1 Feb. 7, 2013

(30) Foreign Application Priority Data

Dec. 15, 2009 (NL) .................................. 1037554

(51) Int. Cl.
*H04L 9/32* (2006.01)
*H04L 9/00* (2006.01)
*H04L 9/28* (2006.01)

(52) U.S. Cl.
CPC .. *H04L 9/00* (2013.01); *H04L 9/32* (2013.01); *H04L 9/28* (2013.01)

(58) Field of Classification Search
CPC ........... G06F 21/00; G06F 12/14; H04L 9/32; H04L 9/08; H04L 9/00; H04L 9/28
USPC .................. 713/186, 189, 183, 185
See application file for complete search history.

(56) References Cited

U.S. PATENT DOCUMENTS

| 2002/0091937 | A1* | 7/2002 | Ortiz | 713/200 |
| 2004/0193893 | A1* | 9/2004 | Braithwaite et al. | 713/186 |
| 2008/0137861 | A1* | 6/2008 | Lindmo et al. | 380/270 |

FOREIGN PATENT DOCUMENTS

| EP | 2 003 590 A1 | 12/2008 |
| WO | WO 00/00882 A2 | 1/2000 |
| WO | WO 2006/075917 A2 | 7/2006 |

OTHER PUBLICATIONS

The International Search Report released by the European Patent Office on Feb. 23, 2011 for PCT/NL2010/050849.

*Primary Examiner* — Jeffrey Pwu
*Assistant Examiner* — Samuel Ambaye
(74) *Attorney, Agent, or Firm* — Smith Gambrell & Russell LLP

(57) ABSTRACT

The invention relates to a system for verifying the identity of an individual by employing biometric data features associated with the individual, which system comprises at least one or more hardware components, an enrollment means, and a verifying means, wherein said enrollment means are arranged in deriving a first biometric template data, said first biometric template data being secret and associated with a first set of first biometric data features of said individual, and in receiving a further set of first biometric data features of said individual, and in deriving a further biometric template data associated with said further set of first biometric data, and wherein said verifying means are arranged in comparing the first biometric template data with the further biometric template data to check for correspondence, wherein the identity of the individual is verified if correspondence exists. The invention aims to provide a solution to the above identified drawbacks and thereto at least one of said hardware components is provided with at least one component specific data feature associated therewith and wherein said enrollment means are arranged in associating at least one of said component specific data features with said biometric template data.

11 Claims, 4 Drawing Sheets

Figure 1:
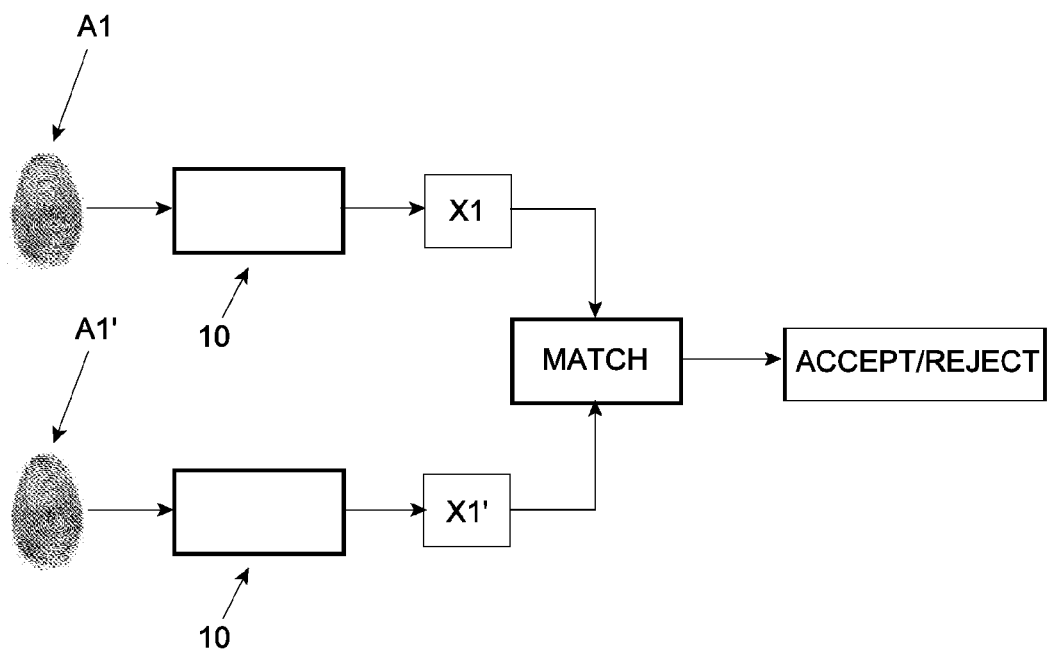

SYSTEM AND METHOD FOR VERIFYING THE IDENTITY OF AN INDIVIDUAL BY EMPLOYING BIOMETRIC DATA FEATURES ASSOCIATED WITH THE INDIVIDUAL

CLAIM OF PRIORITY

This application is the National Stage filing under 35 U.S.C. 371 of International Patent Application No. PCT/NL2010/050849 filed on Dec. 15, 2010, which claims priority from Netherlands Application No. 1037554 filed on Dec. 15, 2009, all of which are incorporated by reference herein in their entirety.

The invention relates to a system for verifying the identity of an individual by employing biometric data features associated with the individual, which system comprises at least one or more hardware components, an enrolment means, and a verifying means, wherein said enrolment means are arranged in deriving a first biometric template data, said first biometric template data being secret and associated with a first set of first biometric data features of said individual, and in receiving a further set of first biometric data features of said individual, and in deriving a further biometric template data associated with said further set of first biometric data, and wherein said verifying means are arranged in comparing the first biometric template data with the further biometric template data to check for correspondence, wherein the identity of the individual is verified if correspondence exists.

The invention also relates to a method for verifying the identity of an individual by employing biometric data features associated with the individual using a biometric verifying application, which method provides privacy of said biometric data features, at least comprising the steps of:

a) for enrolment purposes deriving a first biometric template from at least one set of biometric data features associated with said individual, and b) for identity verifying purposes deriving a further biometric template from at least a further set of said biometric data features associated with said individual, and c) comparing said further biometric template with said first biometric template for correspondence.

The invention also relates to a computer program product comprising program code means stored on a computer readable medium for performing the method according to the invention, when said program product is run on a computer.

Authentication of physical objects may be used in many applications, such as conditional access to secure buildings or conditional access to digital data (e.g. stored in a computer or removable storage media), or for identification purposes (e.g. for charging an identified individual for a particular activity). Every human being has a unique set of biometric data features, such as voice, fingerprints, iris, retina, face, etc. These are normally referred to as biometric modalities. The use of biometrics is, to an ever-increasing extent, considered to be a better alternative to traditional identification means, such as passwords and PIN-codes and, indeed, biometric information (data features) is increasingly used to verify and authenticate a person's identity in an ever-growing number of applications and situations.

In order to be able to perform an authentication, a biometric system must store biometric information. This information takes the form of biometric templates which are, for example, stored on personal tokens such as smart cards or in central databases during enrolment and compared with a live measurement during authentication. Typically, the storage of biometric information is governed by a trust model, whereby a user receives assurances that the information as provided will only be used for specific purposes and that abuse will be prevented by a security regime for the data.

Unfortunately, while in theory this should provide a complete solution that addresses all concerns from citizens and the privacy community, in practice every security regime becomes vulnerable when deployed on a large scale, and widespread use inevitably leads to insider abuse and outside attacks, e.g. by hackers. It will be apparent that biometric applications are a tempting target for identity thieves, so traditional biometric systems have protected biometric templates by storing them in encrypted form. However, in this situation the encryption and decryption keys are not under control of the individual but they are under control of the system owner who thus has access to personal biometric information.

In order to circumvent these problems, in the past years so-called template protection methods also known as biometric encryption (BE) methods were developed to protect the privacy of the biometric information (templates) stored in biometric systems. In essence these methods use one-way functions (OWFs) to protect the biometric information mimicking the known art to protect, for example, passwords.

A OWF is a function or a process for which, given an input, it is easy to compute the output but, when given the output and the function or process description, it is very difficult to obtain the input. An example of a OWF is a cryptographic hash, but there are many other functions and processes that posses a one-way behaviour.

The use of a biometric encryption method employing OWFs prevents an attacker in obtaining information about a biometric template X1. In essence, during enrolment, given a biometric template X1, the information OWF(X1) is stored in the biometric system, where OWF is a one-way function. In this sense, the OWF forms an integral part of the biometric information. Due to the one-way character of OWFs it is extremely difficult to retrieve the biometric template X1 from OWF(X1).

An important property of any biometric system is the recognition accuracy which is expressed in terms of the False Accept Rate (FAR) and the False Reject Rate (FRR). The FAR is the probability that the biometric system will incorrectly accept an unauthorized user. Likewise, the FRR is the probability that an authorized user is rejected. Therefore, lower FAR and FRR values indicate a better recognition performance of the biometric system.

In order to perform the verification (or identification) procedure in such systems, first some reference data features are measured and stored in e.g. a central database or on a smart card. This is called the enrollment. The enrolled biometric data features are defined as the biometric template and can be seen as a summary of discriminative features derived from the biometric information.

In a subsequent verification phase, a person claims his identity, and the measured biometric data is compared with the biometric template corresponding to the claimed identity. The comparison can be done in many ways, but usually it involves some kind of distance measure. Using a threshold, one can distinguish if both templates are close enough, and if the identity of the person is equivalent to the claimed one. Once a correspondence between the both templates has been determined, the identity of the person is acknowledged as being true.

In the past years it was recognized that storing enrolled templates is a potential privacy threat. As stated in the prior art cross matching between databases is one of the reasons why it is essential to store the biometric templates in a secure manner in a database or on a smart card. Furthermore, many countries have legislation that forbids that biometric information being collected for one biometric application is to be used in another biometric application without the consent of the owner of the underlying biometrics.

However, currently there are no technical means to prevent a piece of biometric information collected for one biometric application to be used in another biometric application nor to trace back a piece of biometric information to its original application. This makes it easy to abuse biometric information and it is not possible if not impossible for law enforcement authorities to prove that a biometric application makes illegal use of biometric information.

The invention aims to provide a solution to the above identified drawbacks and thereto at least one of said hardware components is provided with at least one component specific data feature associated therewith and wherein said enrolment means are arranged in associating at least one of said component specific data features with said biometric template data.

Likewise the method according to the invention comprises the steps of d1) obtaining at least one application data feature associated with said biometric verifying application, and d2) associating said first biometric template with said at least one application data feature obtained in step d1).

By linking (associating) one or more unique hardware component specific data features to the biometric information (as with the device according to the invention) or more in particular linking the hardware component specific data features to a specific application data feature (when performed by the method according to the invention) and then irreversibly linking the specific application data feature to the biometric information, a more significant level of biometric security can be obtained. Because of the irreversibility of binding the application identifier(s) to biometric information and linking of the application identifier(s) to at least one hardware component (having a unique component specific data feature), the biometric information can be used only when the at least said hardware component is present in the system or device implementing the biometric system authentication/encryption method according to the invention.

This link between hardware (for example a micro-processor, a dongle, a memory chip, etc.) and application components (for example a biometric software application) makes it very difficult to use biometric information collected in one application in another application having a different application data features and implementing other hardware components with different unique component specific data features. Furthermore, the irreversible binding of the application components (and its linked hardware components by means of the hardware identifiers) to biometric information makes it impossible to use the biometric information without the correct application identifier being present in the system and gives law enforcement offices the possibility to trace back the origin of biometric information.

Further beneficial embodiments and features of the device and method according to the invention are described in the dependent claims.

Figure 2:
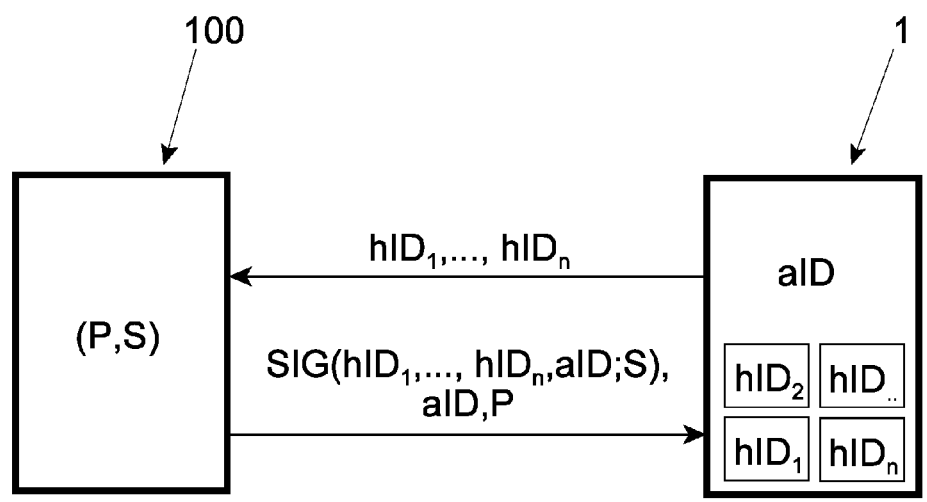
Figure 3:
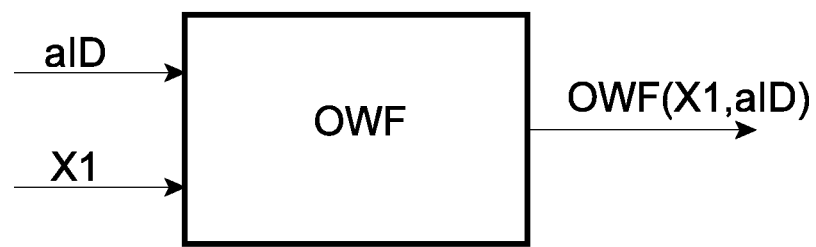
Figure 4:
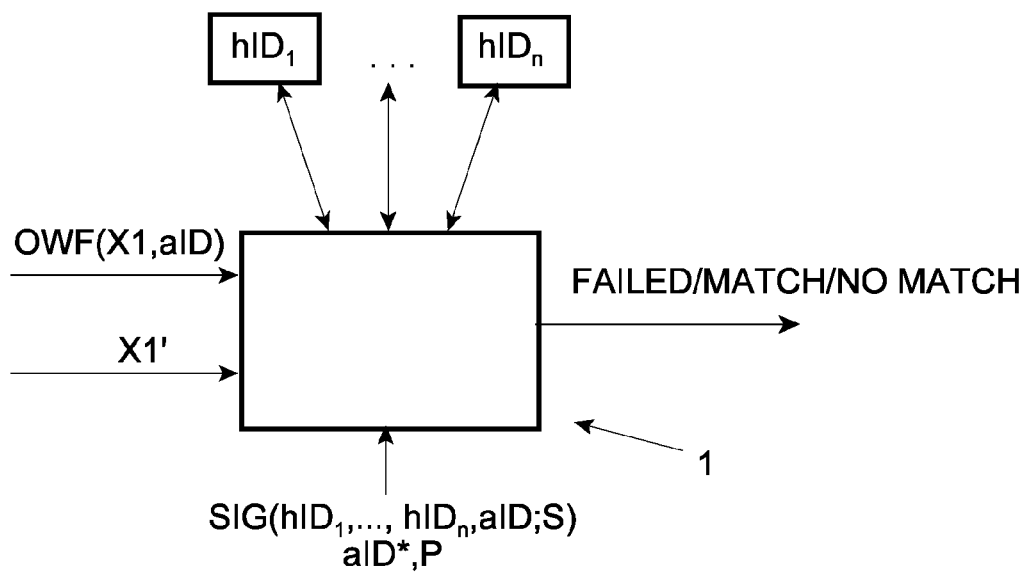

The invention will now be explained in more detail with reference to a drawing, which drawing shows in:

FIG. 1 a system for verifying the identity of an individual by employing one set of biometric data features according to a traditional state of the art approach;

FIG. 2 a first aspect of a system and method for verifying the identity of an individual by employing the invention;

FIG. 3 a further aspect of the system and method according to the invention;

FIG. 4 a further aspect of the system and method according to the invention.

Although clearly it is possible to use more any type of biometric modality or sets of different biometric data features (finger print, iris scan, facial scan, voice scan, etc.), for the sake of clarity the invention will now be described below with reference to the use of a single type of biometric data features, namely a finger print. However it is to be understood, that the figurative description below should not be interpreted as a limitation of the invention.

Also for the sake of clarity identical parts of the invention are denoted with the same reference numerals. In FIG. 1 an example is shown of a system according to the state of the art. In general, biometric verification techniques are composed of an enrolment procedure and a verification procedure.

In FIG. 1 an identity verification procedure is disclosed using one type of biometric information, for example the image of a right index finger of an individual, which biometric information (or data features) are denoted as data A1 according to a traditional non-private state of the art approach.

In this example, it is presumed that an individual wishes to enroll as a member of a chain of casinos that uses biometric identification (using e.g. a index finger print A1 in FIG. 1) for access control. For enrolment purposes the biometric data A1 is transformed, for example using traditional non-private techniques (denoted with reference numeral 10), into a biometric data template X1, which biometric template data X1 is stored on suitable storage means (not depicted) for future use.

For verification purposes (hence, when the enrolled individual wishes to obtain access in a casino), said individual presents his index finger in order to obtain biometric data A1', respectively. Again said biometric data A1' is transformed, in a similar way as during the enrolment procedure, into a further biometric template data X1'. Both the biometric template data X1 and the biometric template data X1' are presented (or offered) to a matching function MATCH, which outputs an ACCEPT or REJECT decision based on the comparison between X1 and X1'.

In the explanation below we will use an identifier that is specific for an application. In the specification below an 'application' is defined as a collection of more than one individual in combination with a specific common use case. For example, an application could be the members of a family with the use case of entering their house. A different application could be all the clients of a bank who want to manage their banking business via the Internet. A further example consists of the employees of a company who want to get access to the company premises. A last example is the collection of all nationals of a certain country, who want to own a biometric passport to facilitate border crossings.

In many applications, biometric authentication is used in implementing the application. Following the examples above, the family can put a biometric lock on their front door to enhance convenience while at the same time keeping unwanted visitors out. A bank might want to introduce biometric authentication for internet banking applications to be sure that indeed the claimed identity is performing the transaction. Corporate cards using biometrics guarantee that these cards cannot be 'borrowed' to get access to the company premises and, lastly, in many countries a passport containing biometric information is now mandatory.

In all applications using biometrics, biometric reference information of individuals must be stored. According to the invention, each application is associated with an identifier (ID), also referred to as an ApplicationID or aID. The application specific identifier is irreversibly bound to and forms an integral part of all the biometric information stored in that specific application. Furthermore, according to the invention the application identifier aID is linked to at least one hardware components of the system or device implementing the biometric authentication/encryption method according to the invention.

It is known in the art that many hardware components of computer systems have unique hardware identifiers (component specific data feature or hIDs). Such a unique component specific data feature hID is tightly linked to the physical hardware and might take the form of a hard disk serial number, a network adapter MAC address, a processor ID, etc. Alternatively, one could think of dedicated hardware (such a hardware dongle) that is specifically used to store an identifier. In the known art these identifiers are sometimes used to link software to a specific piece of hardware thus preventing illegal copying of the software. As opposed to the know art, in this invention we propose not to link the biometric software but the biometric information itself to at least one part of hardware using a component specific data feature hID and a system (or application) associated component specific data feature aID.

By linking one or more unique component specific data features hID to a specific application aID and irreversibly linking aID to the biometric information, a more significant level of biometric security can be obtained. Because of the irreversibility of binding the aID identifiers to biometric information and linking of the aID to at least one hardware component (having a unique component specific data feature hID), the biometric information can be used only when the at least said hardware component is present in the system or device implementing the biometric system authentication/encryption method according to the invention.

This link between hID and aID makes it very difficult to use biometric information collected in one application in another application having a different aID' and implementing other hardware components with different unique component specific data features hID'. Furthermore, the irreversible binding of the aID (and its linked hardware components by means of the hardware identifiers hID) to biometric information makes it impossible to use the biometric information without aID being present in the system and gives law enforcement offices the possibility to trace back the origin of biometric information.

According to this invention irreversibly linking the aID to the biometric information is done by making the input of the OWF that is part of the biometric information dependent not only on the biometric template X1 but also on the aID such that, as shown in FIG. 3, instead of storing OWF(X1) in the biometric system, OWF(X1, aID) is stored such that aID now forms an integral part of the biometric information. Given a candidate template X1' and access to aID, by calculating OWF(X1',aID) and comparing it with OWF(X1,aID) it can be decided if X1 and X1' are equal.

Obviously, when an attacker steals the stored information OWF(X1, aID) but does not have access to aID he cannot use it to compare biometric templates X1' with OWF(X1,aID). Moreover, even if the attacker obtains aID it is not possible to remove it from OWF(X1, aID) such that when he is using this information in his own biometric system, aID is still embedded in the biometric information and is required during the comparison process and hence makes it possible to trace OWF(X, aID) to its original application/system 1.

In order to explain this traceability, assume that a first application (APPL1) has system associated component specific data feature (application identifier) aID1 embedded in its biometric information. Further assume that APPL1 has sold or given biometric information to a second application APPL2 together with aID1. Alternatively, the biometric information as well as identifier aID1 could have been stolen from APPL1 to set up an biometric encryption application APPL2.

By verifying the inputs of the biometric verification algorithm, privacy authorities can first check which aID APPL2 is using and secondly, if the use of the biometric templates with the corresponding aID is legitimate or not.

In order to prevent abuse, the application identified aID must be kept secret because, clearly, having access to aID and OWF(X1,aID) makes it possible to, given X1', verify if X1 and X1' are equal. However, in practical situations keeping the system associated component specific data feature (application identifier) aID secret is extremely difficult, even more so because the secret aID is required in every comparison of X' and X.

Therefore, according to the invention the application/system application identifier aID is linked to one or more hardware component identifiers hID thus essentially making the biometric information dependent on the hardware component identifiers hID.

FIG. 2 shows a specific feature of the present invention, which is used during initialization of the system 1 implementing the application. According to the invention the system 1 interacts with an external module 100 which module generates or incorporates a public-private key pair (P, S). The external module 100 is inputted with one or more of the hardware component identifiers (component specific data features) hID1..hIDn generates an identifier aID specific for the application and returns to the system or application (software) 1 a signature SIG(hID1..hIDn, aID; S). Said signature SIG is generated over at least one of said component specific data features hID1..hIDn (associated with the several hardware components implemented in the system/application 1) and, the system associated component specific data feature (application identifier) aID using said private key S. Module 100 also returns to the application/system 1 the public key P corresponding to the private key S as well as the application specific identifier aID.

Therefore, according to a further aspect of the invention, and as stipulated above in connection with FIG. 2 above the application identifier aID is associated or linked to at least one hardware component/component specific data feature hID1.hIDn without the need for any secrecy of aID at the side of the application.

The system or application 1 places the public key P and SIG(hID1, . . . ,hIDn, aID; S) in the application (for example in suitable storage means) such that the biometric matching software has access to this information at a later stage, for example during verification. Preferably, the public key P could be incorporated in the biometric comparison algorithm according to the known art.

After the above described initialisation phase of linking aID to at least one hardware component, the system can be used for enrolment and verification.

As in any biometric system, before an individual can use a system, enrolment has to take place where biometric reference information is stored in the biometric system. During enrolment the biometric enrolment algorithm/method according to the invention comprises the following steps (in connection with FIG. 1 and FIG. 3):

First the biometric information X1 is obtained, for example a finger print or iris scan. In FIG. 3 OWF(X1, aID) is generated and stored in the biometric system. This step binds the application identifier aID (thus system 1) in an irreversible manner to the biometric information X1.

During the verification step (see FIG. 4), the biometric comparison algorithm checks if the correct hardware is present in the system/application 1 and verifies whether the biometric information X1' originated from the same person as the biometric information X1 that was used to generate OWF (X1, aID).

The verification process is conducted according to the invention through the following steps:

The biometric information X1' is taken and OWF(X1, aID) is retrieved from the suitable storage means of the system 1. Likewise the at least one further component specific data features (hardware identifiers) hID*1.hID*n associated with one or more hardware components present in the system or application 1 are read out or otherwise requested from the hardware components. It is a necessary security feature that the biometric verification algorithm forces that the hardware identifiers hID* are obtained by polling the actual hardware component rather than reading the identifiers hID* from a computer memory. Furthermore, an application identifier aID* is retrieved from suitable storage means of the system 1.

The verification means of the system 1 retrieves the signature SIG(hID1, . . . ,hIDn,aID;S) and the public key P which were previously stored in the system 1 (in connection with FIG. 2). According to the invention the verification means of the system 1 check if hID1=hID* . . . hIDn=hID*n and whether aID=aID* using P, SIG(hID1, . . . ,hIDn,aID;S) and the appropriate signature verification algorithm. If the signature verification fails, the biometric verification algorithm outputs a FAILED message. This means that a difference has been noticed between the hardware components used during the enrolment process and used for the verification step or that the biometric verification is implemented on an application/system platform exhibiting a different application identifier aID.

In the event the signature verification is successful, that is the verification is performed on an application/system platform 1 incorporating the correct hardware components hID1..hIDn and the same application identifier aID as during the enrollment, the verification proceeds and will now check whether the biometric X1' to be verified corresponds (matches) the biometric information X1 previously encrypted in the biometric template using the OWF(X1, aID) in FIG. 3.

According to the invention X1' and aID* are used to check whether OWF(X1, aID)=OWF(X1', aID*). If this check concludes that indeed OWF(X1, aID) is identical to OWF(X1', aID*), it is assumed that X1 and X1' originate from the same individual (MATCH), otherwise it is assumed that they originate from different individuals (NO MATCH).

According to the invention, a comparison between X1 and X1' is avoided or prevented if either one of the hardware components hID is not present in the system platform 1 or if the application identifier aID is not correct. Otherwise, the actual biometric comparison is performed.

It is clear to a person skilled in the art that there are some trivial extensions or modifications which can be made to the present invention as defined in the claims which are considered of falling within the scope of protection.

In one embodiment the external module 100 could be owned or operated by a 'third party' communicating with the application (system) 1. This third party may take the role of issuing or controlling application identifiers and may approve exchange of hardware components in a system by issuing a new signature over the hID of a new hardware component in a biometric system. The third party owning or operating module 100 could further maintain a tracking register of which aIDs are issued to which application/system platforms 1 so that in case a certain identifier aID is found, it can be traced back to an application.

This is made possible because a OWF(X1, aID) can only be used during verification when aID is present and therefore it should be stored somewhere in the application. If an application is using a specific aID but if this aID was not issued for this application (as can be checked by third party operating the module 100), the application might use the information OWF(X, aID) illegally. However, as a second embodiment, the role of third party (module 100) might be taken up by the owner of the system/application 1 itself. According to this invention this still has the benefit that the secret information (in this case the private key S) is not required in normal operating conditions but only during system initialization.

Furthermore, in FIG. 2 it is assumed that the application identifier is generated by module 100 which has some benefits in certain settings. However, the application identifier can also be generated by the system implementing the application and be sent to module 100 together with hID1 . . . hIDn for signing. Likewise, the public key P corresponding to the private key S used to generate the signature could be incorporated in the biometric comparison algorithm rather than being sent by module 100 to the system 1.

Also, one could also easily make a scheme in which only a subset of a given set of hardware components hID has to be present. This can be achieved, for example, by using several signatures over subsets of hardware identifiers hID and the application identifier aID, or using techniques known as secret sharing. This has the advantage that in case a limited number of the hardware components break down, the system can remain in operation.

A large collection of biometric information of the form OWF(X1, aID) can be seen as an asset for an application 1. On the other hand, application 1 might want to share this information with application 2 in a controlled manner such that application 2 cannot, in turn, share the information with application 3. This can be done using the current invention when the first application acts as a external signature issuing module 100 according the initialization algorithm of FIG. 2.

The invention claimed is:

1. A system for verifying the identity of an individual by employing biometric data features associated with the individual, which system comprises at least one or more hardware components, at least one of said hardware components having at least one first hardware component specific data feature associated therewith, a biometric verifying application having at least one specific application data feature associated therewith, wherein said at least one application specific data feature is linked to said at least one hardware component specific data feature, an enrolment means, and a verifying means, wherein said enrolment means are arranged in deriving a first biometric template data, said first biometric template data being a biometric encryption template and associated with a first set of first biometric data features of said individual, and in receiving a further set of first biometric data features of said individual, and in deriving a further biometric template data associated with said further set of first biometric data, and wherein said enrolment means are arranged in irreversible linking at least one of said application specific data feature with said biometric template data, such that said application specific data feature forms an integral part of the biometric template, wherein said verifying means are arranged in comparing the first biometric template data with the further encrypted biometric template data to check for correspondence, wherein the identity of the individual is verified if correspondence exists, wherein said verifying means are arranged in obtaining at least one further hardware component specific data feature from said at least one hardware component and in obtaining the first hardware component specific data feature linked with said at least one application specific data feature and in comparing both said first and further hardware component specific data features to check for correspondence.

2. The system according to claim 1, wherein said system further comprises an external module for generating a first application specific data feature.

3. The system according to claim 2, wherein said external module is arranged in linking said first application specific data feature with said at least one hardware component specific data feature using cryptographic algorithms.

4. The system according to claim 2, wherein said external module is arranged in generating a public-private key pair and in generating a signature over at least one of said first hardware component specific data feature and at least one of said first application specific data feature using said private key.

5. The system according to claim 4, wherein the system further comprises storage means for storing said first biometric template data, the public key and the signature.

6. The system according to claim 2, wherein for verification purposes said system is arranged in obtaining the at least one of said further hardware component specific data features from the actual hardware components and in obtaining a further application specific data feature and in obtaining the signature issued by the external module and verifying the signature using said public key.

7. The system according to claim 6, wherein the verifying means are arranged in comparing both said first and further hardware component specific data features to check for correspondence as well as said first and further application specific data feature to check for correspondence.

8. A method for verifying the identity of an individual by employing biometric data features associated with the individual in a system for verifying the identity of an individual, said system comprises at least one or more hardware components, at least one of said hardware components having at least one first hardware component specific data feature associated therewith, a biometric verifying application having at least one application specific data feature associated therewith, which method provides privacy of said biometric data features, at least comprising the steps of:
  a) linking at least one application specific data feature to at least one hardware component specific data feature, and
  b) for enrolment purposes deriving a first biometric template from at least one set of biometric data features associated with said individual, and
  c) for identity verifying purposes deriving a further biometric template from at least a further set of said biometric data features associated with said individual, and
  d) comparing said further biometric template with said first biometric template for correspondence,
wherein step b) further comprises the steps of
  e1) obtaining at least one application specific data feature associated with said biometric verifying application,
  e2) irreversible linking said at least one of said application specific data feature obtained in step e1) with said first biometric template, such that said application specific data feature forms an integral part of the first biometric template; and
wherein step c) further comprises the steps of:
  f1) obtaining at least one further hardware component specific data feature from said at least one hardware component, and
  f2) obtaining the first hardware component specific data feature linked with said at least one application specific data feature, and
  f3) comparing both said first and further hardware component specific data features to check for correspondence.

9. The method according to claim 8, wherein step c) further comprises the steps of
  g1) obtaining said at least one application specific data feature associated with said biometric verification application, and
  g2) deriving said further biometric template using said application specific data feature obtained in step g1).

10. The method according to claim 8 wherein step c) further comprises the steps of
  h1) obtaining at least one further application specific data feature;
  h2) obtaining the first application specific data feature associated with said biometric template data and
  h3) comparing both said first and further application specific data features to check for correspondence.

11. A computer program product comprising program code means stored on a non-transitory computer readable medium for performing the method of claim 8 when said program product is run on a computer.

* * * * *